United States Patent [19]

Baumgärtner et al.

[11] 3,745,320
[45] July 10, 1973

[54] ELECTRON-BEAM CHAMBER
[75] Inventors: Siegfried Baumgärtner, Sixtnitgern; Hubert Kindler, Munich, both of Germany
[73] Assignee: Steigerwald-Strahltechnik GmbH, Munich, Germany
[22] Filed: Feb. 22, 1971
[21] Appl. No.: 117,329

[30] Foreign Application Priority Data
Feb. 28, 1970 Germany.................. P 20 09 448.8

[52] U.S. Cl. .......................................... 219/121 EB
[51] Int. Cl............................................ B23k 15/00
[58] Field of Search................ 219/121 R, 121 EB, 219/121 EM; 250/49.5 R

[56] References Cited
UNITED STATES PATENTS
3,360,398  12/1967  Garibotti............................ 117/212
3,322,930   5/1967  Sciaky............................ 219/121 EB
3,433,923   3/1969  McNabb......................... 219/121 EB

*Primary Examiner*—J. V. Truhe
*Assistant Examiner*—Gale R. Peterson
*Attorney*—Karl F. Ross

[57] ABSTRACT

A vacuum chamber for the electron-beam welding of workpieces disposed within an evacuated space is provided with means, consisting either of the symmetry arrangement of the chamber or a fixed mounting of the electron gun and workpiece support, to prevent displacement of the point at which the beam impinges upon the workpiece and the angle of incidence of this beam as the walls of the evacuated space deform under stresses arising from evacuation.

10 Claims, 4 Drawing Figures

Patented July 10, 1973

Siegfried Baumgärtner
INVENTOR

BY

Attorney 3,745,320

ELECTRON-BEAM CHAMBER

FIELD OF THE INVENTION

Our present invention relates to evacuated chambers and, more particularly, to electron-beam chambers.

BACKGROUND OF THE INVENTION

It has been proposed heretofore to weld workpieces together by directing an electron beam at an interface or junction. Such techniques have been found to be highly effective for the joining of relatively small parts, parts made of expensive materials such as noble metals, members having a tendency to oxidize or deteriorate under other welding systems, and workpieces in the electronic field, e.g. circuits, which require precision workmanship not attainable with other systems.

Since an electron beam requires an evacuated space for effective propagation, it is the current practice to provide an evacuated chamber at one end of which is disposed an electron gun, i.e. a thermoemissive cathode, heater means for raising the cathode to an emission temperature and one or more anodes or accelerating electrodes for raising the energy, directing and/or focusing the beam. On the other side of the chamber, a holder is provided for the workpiece which is welded by the beam traversing this chamber. The chamber is evacuated to a high vacuum sufficient to sustain the electron beam.

One of the defects of prior-art devices for this purpose is that the high vacuum generated within the chamber causes distortion such that the beam ceases to fall on the precise workpiece location at which it was originally focused or directed and, frequently, the angle at which the beam impinges upon the workpiece alters. Consequently, the reproducibility of this system is poor and it is not possible to use the vacuum chamber without complete resetting, recalibration etc. for a succession of workpieces. Furthermore, the alternate evacuation and venting of the chamber varies the stress characteristics of the walls thereof and renders each new deformation substantially different from the previous one. The problem is accentuated by the fact that the chamber must be sealed and that X-ray shielding must be provided to minimize the danger to operating personnel.

Attempts to eliminate this disadvantage by providing a considerable number of stiffening ribs upon the walls of the chamber to minimize the deformation under evacuation, have also failed since even the reduced tendency toward deformation frequently disrupts the original settings of the device and causes deviation of the axis of the electron beam from its normal position perpendicular to the workpiece table. Sensitive adjustment must, consequently, be carried out prior to each welding operation.

OBJECTS OF THE INVENTION

It is, therefore, the principal object of the present invention to provide an improved high-vacuum chamber for the purpose described.

It is another object of the invention to provide an electron-beam chamber, especially for the electron-beam welding of a workpiece, which avoids the aforementioned disadvantages and permits the system to be used for serial production.

Still another object of the invention is to provide an electron-beam chamber of simple construction, capable of withstanding high vacuum, resistant to penetration by X-ray or Roentgen rays, and so constructed and arranged that the, or any, deformation upon evacuation does not affect the position at which the electron beam is directed and the angle of incidence of this electron beam.

It is also the object of this invention to provide an electron-beam chamber of low material and construction cost and of an overall stability such that sensitive adjustments are not required for a succession of processes.

SUMMARY OF THE INVENTION

These objects and others are attained, in accordance with the present invention which provides for a construction of the wall members defining the evacuated space such that symmetrical deformation occurs with respect to the beam axis, thereby eliminating the possibility of offsetting the beam from its normal position, or by mounting the workpiece and the electron gun so as to be unaffected by the deformation of the evacuated enclosure.

Hence the electron-beam chamber according to the present invention will generally comprise a parallelepipedal enclosure defining the evacuable space which is traversable by the electron beam and has wall members resisting collapse of the enclosure and is provided with a layer of X-ray shielding material enclosing this space. The layer may be composed of lead.

Means are provided along side of the enclosure for mounting an electron gun adapted to project the electron beam across the evacuated space while the workpiece-support means is provided along the opposite side of the enclosure and therewithin for positioning a workpiece in the path of the electron beam. Suitable means, e.g. an opening in a lateral wall of the chamber, is provided for connecting the evacuable space to the usual high-vacuum suction source and means is also provided for maintaining the point of attack of the beam on the workpiece and the angle of incidence of the beam thereon substantially constant prior to, during and subsequent to evacuation of the space.

In accordance with one aspect of the invention, the last-mentioned means is constituted by a symmetrical arrangement of the top, bottom and lateral walls of the enclosure, the walls being lined externally with lead and together forming a substantially rigid but deformable body. When the top wall is provided at its geometric center with means for mounting the electron gun thereon such that the axis of the beam coincides with this geometric center and the workpiece-support means at the bottom of the structure is also centrally symmetrical with respect to the beam, every point on each wall has an opposing equivalent point of geometric and structural similarity such that each pair of symmetrical points defines a line bisected by the axis.

As noted, the workpiece support includes a support structure carrying the workpiece and resting upon the bottom wall which, in turn, is supported upon a pedestal. The support structure is centrally symmetrical above the beam axis and may include a pair of parallel rails along which the workpiece table is displaceable by an appropriate mechanism, the rails bearing against the bottom wall of the structure. Beneath the bottom wall, however, we provide a pair of broad-flange beams which are aligned with the rails in common vertical planes to transfer directly the load of the workpiece and the workpiece support structure to the aforementioned base.

According to another aspect of the invention, the electron gun and the workpiece support are fixed with respect to one another on opposite sides of the evacuable space which, in turn, is defined by a receptacle within the latter structure. Thus, while the receptacle may distort as a result of evacuation, such distortions are not transferred to the surrounding structure. The latter may comprise frames having webs extending inwardly to position, locate or hold the thin-wall inner receptacle which has openings in its bottom to permit the rails of the workpiece support to be mounted directly on the beam by pedestals passing through openings in the thin-wall enclosure. These openings and the window at the top of the receptacle through which the electron beam is introduced, are sealed by expansible metal bellows to prevent pressure loss.

The invention is characterized, in accordance with its first aspect as noted above, by the fact that the chamber need not be stiffened to resist all deformation upon evacuation. As a practical matter, a prismatic chamber cannot be sufficiently strengthened totally to resist deformation without making the wall so large as to render the chamber uneconomical. Any step short of total stiffening, however, results in a chamber which deforms to a certain extent, the deformation being magnified as a displacement of the electron beam. When the chamber comprises a top wall or cover plate, a bottom wall or floor plate and at least a pair of vertical walls or plates bridging the top and bottom walls and extending perpendicularly thereto, we have found that the evacuation-produced deformations can be rendered ineffective with respect to the position and orientation of the electron beam when the beam is positioned precisely at the geometrical center of the top plate or wall and hence along the geometrical center of the chamber and the evacuated space enclosed thereby. Furthermore, the position, location or point at which the electron beam is trained upon the workpiece, should coincide with the geometrical center of the bottom plate or wall. Moreover, the chamber and especially the surfaces of the walls defining the evacuated space should by symmetrical with respect to the axis of the electron beam.

The term "symmetrical" is used herein to refer to central symmetry, i.e. the symmetry which results when every point in a horizontal plane perpendicular to the axis of the electron beam and lying along a space-defining surface of one of the walls corresponds to a point in the same plane of a space-defining surface of geometrical similarity with respect to position and nature such that the line joining these points is bisected by the axis of the electron beam.

Furthermore, central symmetry implies that the axis of the beam is a locus of points constituting centers of point symmetry so that in general, for each point P of the walls defining the evacuated space, there exists a point P' of these walls such that the line P—P' is bisected by the axis of the electron beam.

The symmetrical construction of the chamber in this manner results in a symmetrical deformation such that the bowing of the walls leads only to an axial displacement of the electron gun and the location at which the electron gun beam is trained upon the workpiece so that this location or point does not shift and the orientation of the beam with respect to this point also does not change. Hence, the impingement point and the angle of incidence do not change.

Varying devices, means and the like may be provided on the walls of such a chamber and it will be self-understood that these devices must also be disposed symmetrically. For example, the means for mounting the electron gun on the top wall must be centrally symmetrical with respect to the axis of the electron beam while the means for supporting the workpiece on the bottom wall must be centrally symmetrical as well. In addition, the openings in the lateral walls for evacuation and observation of the space must be symmetrical with respect to the axis.

According to another feature of the invention, the workpiece is introduced into the chamber on a slide, carriage or table supported on at least one pair of rails, the workpiece support structure being centrally symmetrical with respect to the beam axis. The rails may rest upon the bottom wall of the chamber, in which case we prefer to provide a pair of support beams beneath this bottom wall, in direct line with the rails and lying in a common vertical plane therewith for transferring the load of the rails directly to a pedestal or support on which the beams are disposed. The beams, of the broad-flange type, may serve as means for supporting the chamber on a foundation.

According to a second aspect of the invention mentioned earlier, the evacuable space is defined by a floating thin-wall receptacle which is held in place at spaced-apart locations by a frame structure constituting the lead-shielded wall members. Consequently, while the frame members carry the electron gun and the workpiece-support means, and are unaffected by the deformation of the receptacle, the latter may deform freely. Adjustment is maintained in spite of the deformation of the receptacle. While openings may be provided for passing the beam, introducing the workpiece, evacuating the space and observing the welding process, these openings have vacuum-retentive seals, such as metal bellows, which do not impede the deformation of the receptacle or effectively transfer force to the frame structure.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
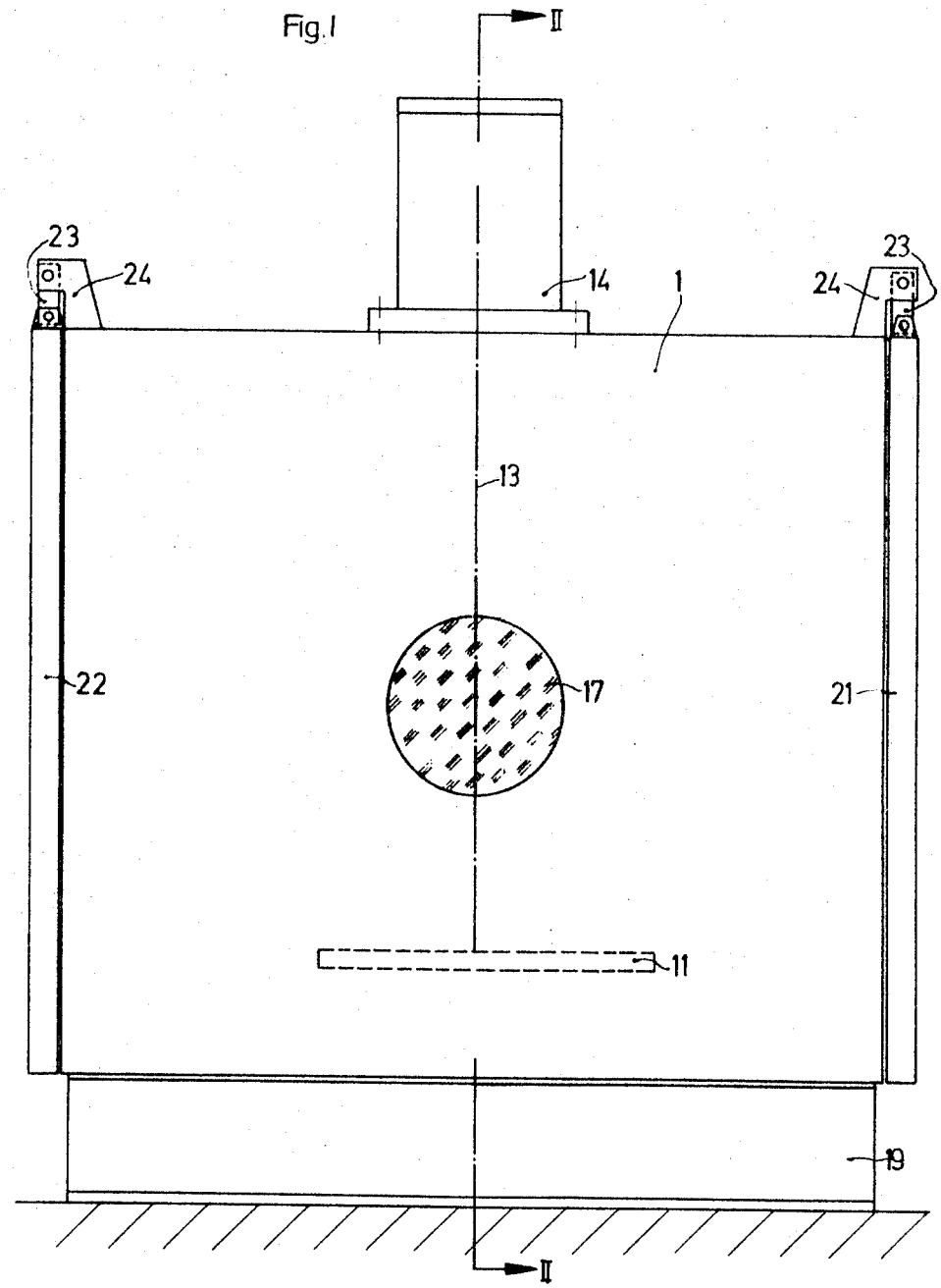
FIG. 1 is an elevational view of an electron beam chamber according to the present invention.
Figure 2:
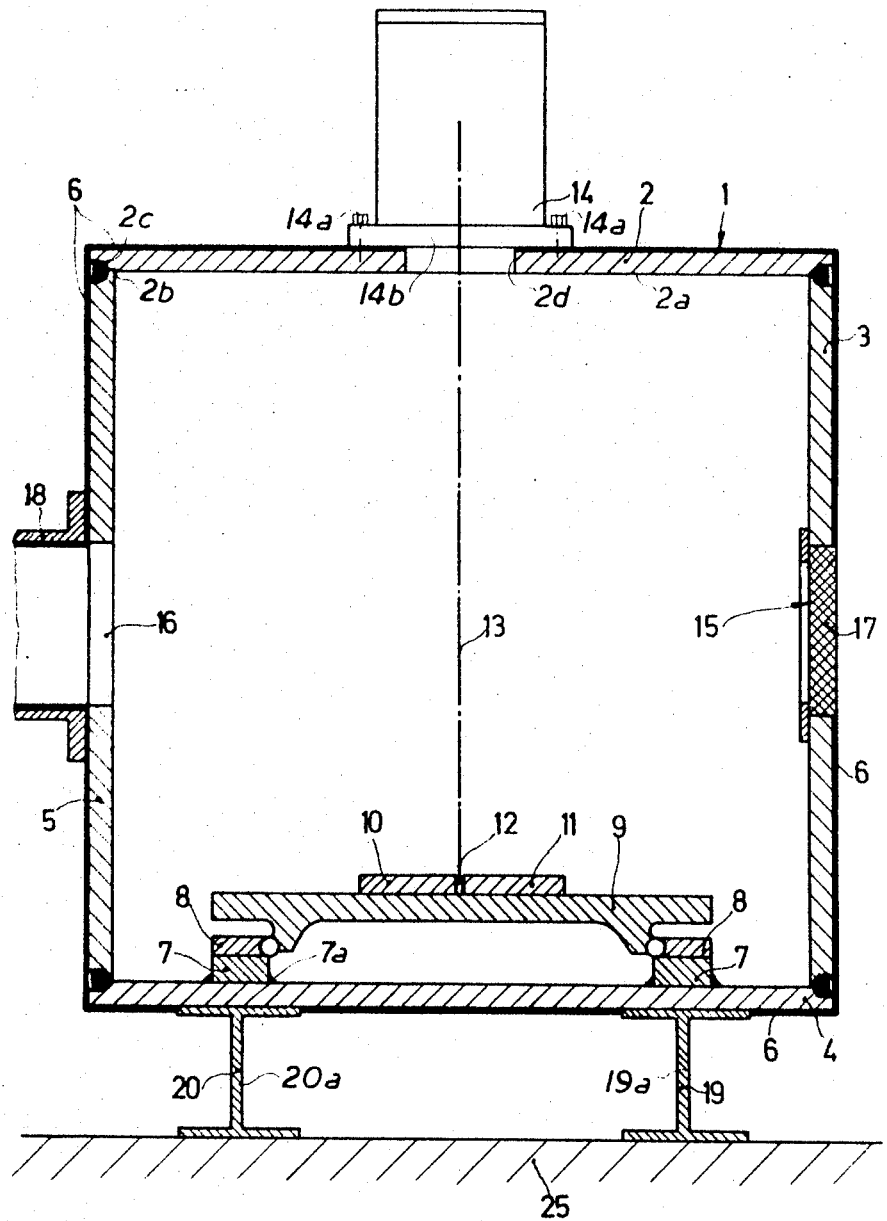
FIG. 2 is a cross-sectional view taken along the line II—II of FIG. 1.

In FIGS. 1 and 2, we show a vacuum chamber generally represented at 1 and consisting of four planar steel plates 2 having at least interior faces 2a, composed of V2$^4$ stainless steel. The plates may be composed entirely of stainless steel or may merely be lined therewith. Along their outer surfaces, the plates 2–5, also referred to as wall members or supports, are clad with plates, sheets or foils of lead, the latter constituting the X-ray shielding material.

The plates 2–5 are butt-welded at 2b, for example, the weld seams 2c being of the bell, U or tulip type.

Along the bottom plate 4, there are provided two support bars 7 of stainless steel, welded at 7a to the plates 4 and disposed symmetrically with respect to a plane of the electron-beam axis 13 and perpendicular to the paper in FIG. 2. Consequently, the bars 7 are centrally symmetrical with respect to this axis.

Each bar 7 carries a guide rail 8 of the workpiece support means, the latter including a table or slide 9 which is shiftable perpendicular to the plane of the paper in FIG. 2 and carries a workpiece represented by the elements 10 and 11 which are to be welded together along a seam 12 by the electron beam 13. An appropriate mechanism may be provided for shifting the slide 9 to dispose the workpiece beneath the electron beam. In this case, both the mechanism and the table 9, when the latter is beneath the beam, should be centrally symmetrical with respect to the axis of the beam. More generally, however, no mechanism is required and the slide 9 is positioned by hand.

At the top of the chamber, i.e. on plate 2, we provide the electron gun 14 which directs the beam 13 downwardly at right angles to the edge region at which the weld is to be effected. The electron gun 14 is disposed at the geometrical center of the roof plate 2 which has a central opening 2d passing the beam. The for affixing the electron gun to the apparatus may include bolts 14a traversing the flange 14b and anchored in the steel plate 2. In addition, the lateral wals 3 and 5 are provided with respective openings 15 and 16 which are positioned symmetrically with respect to one another, the axis of symmetry being the axis of the electron beam 13. The openings 15 and 16 are of identical size and are equispaced from the axis 13 at equivalent portions thereof. The opening 15 constitutes an observation port and is provided with a lead-glass window 17 through which the welding process may be observed, e.g. by the operator. The other opening 16 may be connected to a suction-pump installation via a duct 18 which is flanged to the wall 5.

Also symmetrical with respect to the axis 13 are a pair of rails 19 and 20 of the broad-flange I-beam type upon the top flanges of which rests the chamber. The beams 19 and 20 are welded to the underside of plate 4 with the webs 19a and 20a in the vertical plane of the longitudinal center of the respective rails 18 and 8 which thus transmit their load directly to the foundational base upon which the beams rest. Hence the resultant force vectors of the support bar 7 run through the beams 19 and 20.

FIG. 1 shows the chamber 1 in a side elevation which the lead-glass window 17 is seen to lie in the center of the fixed lateral wall 3 while the electron gun 14 is shown to be located at the geometrical center of the top wall. Here again it is apparent that the electron beam 13 runs perpendicularly to the workpiece 11 so that the angle of incidence is 90°. Both ends of the generally cubic chamber are closed by freely hanging doors 21 and 22 supported by links 23 in the overhanging portion 24 of respective offset hinges. Since the plane of the doors 21, 22 in the free-hanging positions corresponds to the planes of the openings covered by these doors, the application of a vacuum automatically draws the doors inwardly to seal the chamber. The system is used in the usual fashion, i.e. the workpiece is placed upon the table 9, which is positioned in proper alignment with the beam axis 13 as observed through the window 17. The chamber is evacuated and the electron gun energized to weld the workpiece.

The construction of the chamber illustrated in FIGS. 1 and 2 affords a substantial saving in material. For example, a typical chamber in accordance with the present invention has a cubic construction with a cross-section, parallel to any side, of 1.5 m². When the walls are made sufficiently thick to render the deformation effect negligible, the wall thickness must be about 120 mm. With the system of the present invention, however, using symmetrical construction, the wall thickness need only be 40 mm.

Figure 3:
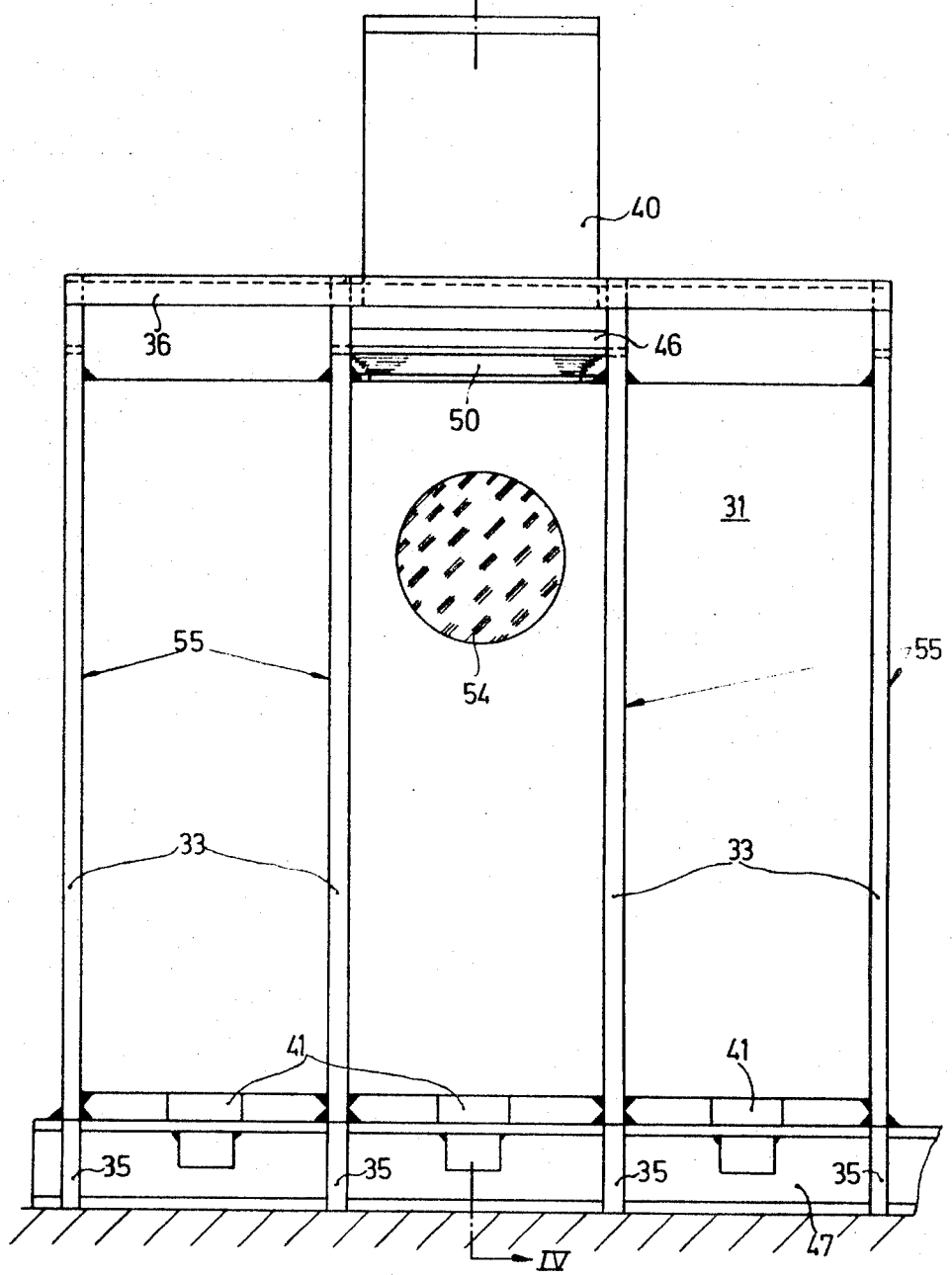
FIG. 3 is a view similar to FIG. 1 but illustrating another electron-beam chamber.
Figure 4:
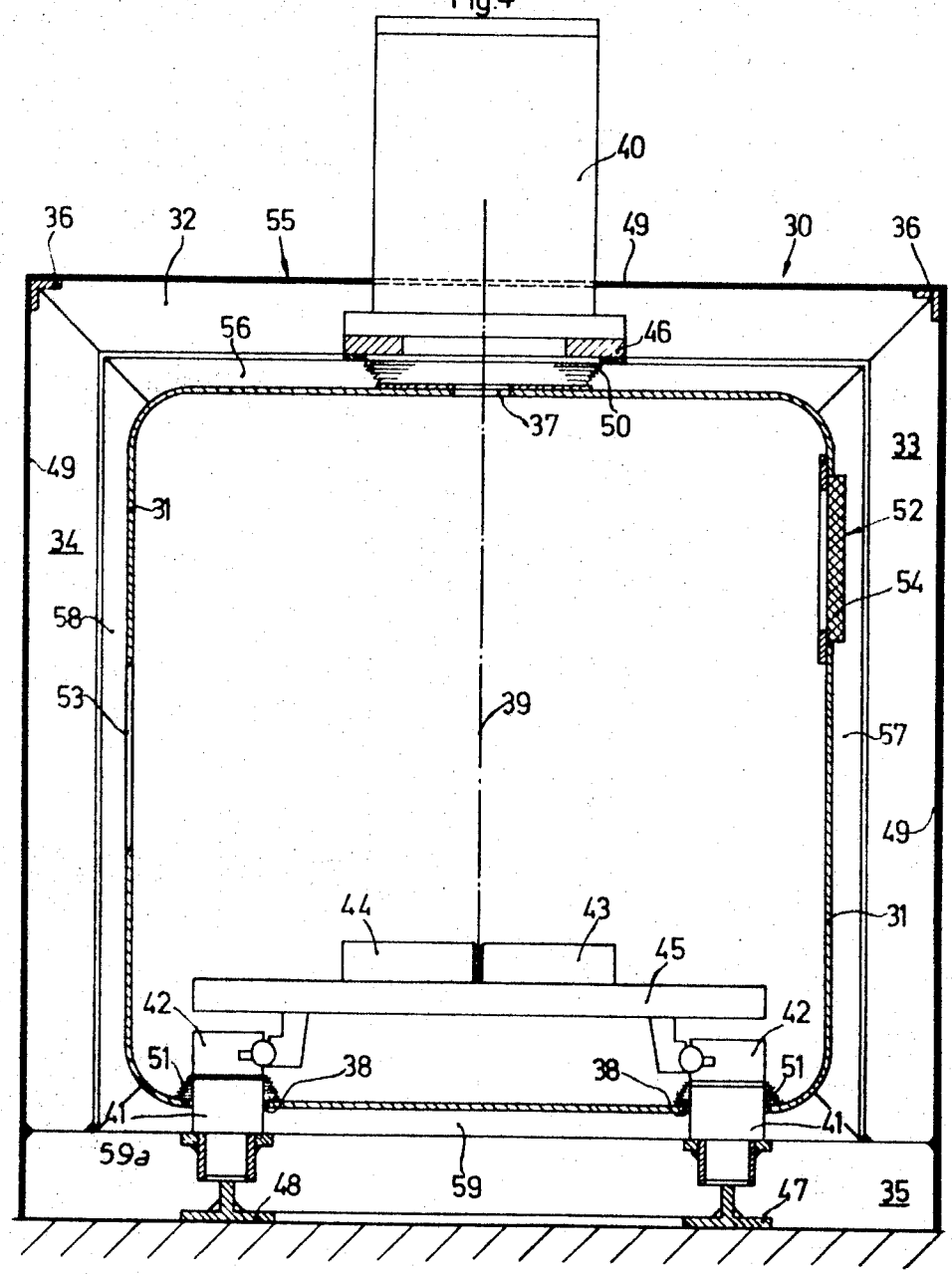
FIG. 4 is a cross-sectional view taken generally along the line IV-IV of FIG. 3.

In FIGS. 3 and 4, we show a vacuum chamber 30 which comprises a vacuum receptacle 31 of thin sheet metal, e.g. stainless steel, with a thickness of 10 mm or less. This receptacle is deformable within wide ranges under evacuation and is mounted within four frames 55, eacho of which is welded from four flat bars 32–35, as will be apparent from FIG. 4. The support structure also includes a flat bar 59 which supports the vacuum receptacle 31 together with flat bars 56–58 which may be welded to the latter and are respectively received within the windows W formed by the frames. The window 59a at the ends of the bars 59 may serve as the only means constraining the receptacle 31 and its frames 56 etc. with respect to the frames 55 of the support structure.

The individual frames 55 are provided with angle irons 36 which support the structure upon a foundation together with broad-flange supports 47 and 48 respectively carrying the workpiece support structure.

The vacuum receptacle 31 is formed with openings 37 and 38, the former being aligned with the electron gun 40 and surrounding the beam 39. The electron gun 40 is secured by a collar 46 constituting a ring, between the intermediate pair of frames 55, as is shown in FIG. 3. The openings 38 are spaced along the beams 47 and 48 and are provided in the floor of the receptacle 31 to clear support pedestals or columns 41 upon which are welded the guide rails 42 carrying the workpiece table or slide 45. The workpiece is here constituted by the two members 43 and 44.

To maintain the vacuum-tight seal of the receptacle 31, metal accordion-pleated bellows sleeves 50 and 51 are connected between the receptacle 31 and the collar 46 or the posts 41. Consequently, the receptacle 31 is thus able to expand and contract freely without loss of vacuum.

Two openings 52 and 53 in the vacuum receptacle 31 serve, as described with respect to FIG. 2, to receive a lead-glass window 54 and a suction-fitting which are mounted elastically upon the receptacle. The X-ray shielding is provided by lead plates 49 which are fastened to the outer faces of the bars 32–34.

As is also apparent from FIG. 3 which is a side-elevational view of the structure shown in cross-section in FIG. 4, but with the lead plates removed to reveal the frames 55, the pins or post 41 are spaced along the path of the workpiece-support table 45.

In the drawing, we have not shown the means for closing the sides of the receptacle 31, corresponding to the doors of FIGS. 1 and 2 and similar doors may be provided for this purpose. However, it is important to note that in the systems of FIGS. 3 and 4, it is not necessary to adhere to any requirement for symmetry since the evacuation of the receptacle 31 has no effect whatsoever upon the orientation of the gun 14 with respect to the workpiece, both of which are fixed independently of the deformations of the receptacle 31.

The improvement described and illustrated is believed to admit of many modifications within the ability of persons within the art, all such modifications being considered within the spirit and scope of the invention except as limited by the appended claims.

We claim:

1. In an electron-beam working chamber capable of deformation upon working the improvement in said working chamber comprising a generally oarallelopipedal enclosure including top, bottom and side wall members; a layer of X-ray-shielding material disposed on said wall members; an electron gun; means on said top wall member mounting said electron gun at the geometrical center thereof whereby the geometrical center of said top wall member lies along the axis of said electron beam; workpiece support means in said enclosure along said bottom-wall member opposite said top wall member for positioning a workpiece in the path of an electron beam from said electron gun; means for connecting said space to a high-vacuum suction source for evacuating said enclosure whereby the locale of attack of said electron gun on said workpiece and the angle of attack of said electron gun thereon remains substantially constant during and subsequent to evacuation of said enclosure.

2. The improvement defined in claim 1 wherein said wall members are angularly adjoining load-supporting walls directly defining said space and provided with respective linings of said X-ray-shielding material, said walls being symmetrical with respect to said axis whereby any point on said walls has an equivalent point of geometric and structural similarity such that the points define a line bisected by said axis.

3. The improvement defined in claim 2 wherein said workpiece-support means includes a support structure carrying said workpiece and resting upon said bottom wall member, said structure being centrally symmetrical about said axis.

4. The improvement defined in claim 3 wherein said structure includes a support table and a pair of rails mounted upon said bottom wall member and slidably carrying said table, and mechanism for shifting said table to position said workpiece in said space, said chamber being further provided with a base and a pair of flanged beams mounted on said base and underlying said bottom wall member whereby said bottom wall member rests directly upon the flanges of said beam, said rails respectively being disposed in common vertical planes with said beams.

5. The improvement defined in claim 4, further comprising a pair of metal plates hingedly mounted on said top wall member, one of said side wall members being provided with an opening constituting said means for connecting said space to said high-vacuum suction source, another of said side wall members being provided with a second opening, disposed symmetrically with respect to the first-mentioned opening, constituting a window for observation of said space, said plates and said wall members being composed of stainless steel and being of substantially uniform thickness, said plates and wall members being lined with lead plates along the respective exterior surface, the lead foils constituting said X-ray-shielding material.

6. The improvement defined in claim 1 wherein said enclosure is a thin-wall receptacle directly defining said space and said wall members are provided externally of said receptacle and include frame structures supporting said receptacle against collapse, said means for mounting said electron gun and said workpiece-support means being provided directly upon said wall members, said receptacle having a window for traversal by said electron beam and openings clearing said workpiece-support means.

7. The improvement defined in claim 6 wherein said wall members comprise a plurality of frames spaced apart in respective planes and extending peripherally around said receptacle while having respective webs connected thereto, said X-ray-shielding material being formed as lead shields secured to the exterior of said frames, said chamber further comprising a base and at least one pair of beams mounting said frames on said base, said workpiece-support means comprising a pair of rails lying within said receptacle, a plurality of pedestals extending through said opening and securing each of said rails to a respective one of said pedestals, a table shiftable along said rails for positioning said workpiece in said receptacle, and respective vacuum-retentive metal bellows surrounding each of said pedestals and connected between them and said receptacle.

8. The improvement defined in claim 7, further comprising a vacuum-retentive bellows secured to said receptacle around said window and anchored to said electron gun.

9. The improvement defined in claim 8 wherein said receptacle is generally prismatic and has a top wall provided with said window, a bottom wall provided with said openings, and a pair of lateral walls connecting said top and bottom walls, one of said lateral walls being formed with an opening enabling observation of said space, the other of said lateral walls being formed with an opening constituting said means for connecting said space to said suction source.

10. The improvement defined in claim 1 wherein said enclosure is generally cubical.

* * * * *